United States Patent [19]

Klaassens

[11] Patent Number: 4,897,775
[45] Date of Patent: Jan. 30, 1990

[54] CONTROL CIRCUIT FOR RESONANT CONVERTERS

[75] Inventor: J. Ben Klaassens, Holland, Netherlands

[73] Assignee: Robert F. Frijouf, Tampa, Fla.; a part interest

[21] Appl. No.: 161,422

[22] Filed: Feb. 24, 1988

Related U.S. Application Data

[63] Continuation of Ser. No. 874,600, Jun. 16, 1986, abandoned.

[51] Int. Cl.$^4$ ............................................. H02M 7/758
[52] U.S. Cl. ........................................ 363/96; 363/137
[58] Field of Search .................. 363/28, 96, 136, 137, 363/160, 164, 173

[56] References Cited

U.S. PATENT DOCUMENTS

| | | | |
|---|---|---|---|
| 3,678,367 | 7/1972 | McMurray | 363/10 |
| 3,882,370 | 5/1975 | McMurray | 363/135 |
| 3,902,107 | 8/1975 | Brown | 363/136 |
| 3,953,779 | 4/1976 | Schwarz | 363/28 |
| 4,024,453 | 5/1977 | Corry | 363/28 |
| 4,096,557 | 6/1978 | Schwarz | 363/160 |
| 4,333,135 | 6/1982 | Schwarz | 363/28 |
| 4,355,351 | 10/1982 | Schwarz | 363/9 |
| 4,367,522 | 1/1983 | Forstbauer et al. | 363/137 |
| 4,409,647 | 10/1983 | Terkanian | 363/135 |
| 4,417,197 | 11/1983 | Schwarz | 323/272 |
| 4,424,834 | 4/1984 | Baumann et al. | 363/136 |
| 4,495,555 | 1/1985 | Eikelboom | 363/136 |
| 4,523,269 | 6/1985 | Baker et al. | 363/98 |
| 4,541,041 | 9/1985 | Parker et al. | 363/132 |
| 4,587,604 | 5/1986 | Nerone | 363/28 |

OTHER PUBLICATIONS

Klaassens; "DC/AC Series Resonant Converter System with High Internal Frequency Generating Multiphase AC Wave Forms for Multikilowatt Power Levels"; Jun. 1985, IEEE.
S. W. H. De Hann, A New Integral Pulse Module for the Series-Resonant Converter, IEEE Transactions on Industrial Electronics, vol. IE-31, No. 3, Aug. 1984, pp. 255-262.
J. B. Klaassens, DC to AC Series-Resonant Converter System with High Internal Frequency Generating Synthesized Waveforms for Multi-kilowatt Power Levels, IEEE Power Electronics Specialists Conference, Jun. 1984, Gaithersburg, Maryland, USA, pp. 99-110.
Schwarz, F. C., Moize de Chateleux, W. L. F. H. A., A Multikilowatt Polyphase ac/dc Converter with Reversible Power Flow and without Passive Low Frequency Filters, IEEE Power Electronics Specialists Conference, San Diego, Jun. 1979, pp. 448-458.

(List continued on next page.)

Primary Examiner—Peter S. Wong
Assistant Examiner—Jeffrey Sterrett
Attorney, Agent, or Firm—Frijouf, Rust & Pyle

[57] ABSTRACT

An improved control circuits is disclosed for use with a resonant converter having a resonant circuit and a first and a second plurality of switches for transferring electrical power between first and second terminals. The improved control circuit comprises a power transfer control or an outer control loop and a resonant circuit control or an inner control loop with the resonant circuit control having a predictor circuit. The power transfer control regulates the electrical power transferred between the first and second terminals through selective conduction of the first and second plurality of switches for selectively initiating oscillation of the resonant circuit to provide resonant pulses of the resonant circuit. A predictor circuit instantaneously monitors the operation of the resonant converter and instantaneously and continuously predicts prior to the completion of each resonant portion when the initiation of conduction of one of the switches will produce a resonant portion having a final waveform in conformity with a pre-established standard. The resonant circuit control compares an output of the predictor circuit to the pre-established standard for initiating conduction of the switches within each resonant portion to conform each resonant portion to the pre-established standard.

12 Claims, 6 Drawing Sheets

OTHER PUBLICATIONS

Schwarz, F. C., Klaassens, J. B., A Reversible Smooth Current Source with Momentary Internal Response for Nondissipative Control of Multi-Kilowatt dc Machines IEEE Transactions on Power Apparatus and Systems, Jun. 1981, vol. PAS-100, No. 6, pp. 3008–3016.

Schwarz, F. C., Klaassens, J. B., A High Frequency Four-Quadrant Multi-Kilowatt dc Machine Drive, Proceedings of the POWERCON 9, Washington D.C., Jul. 1982.

Schwarz, F. C., Engineering Information on an Analog Signal to Discrete Time Interval Converter, NASA CR-134544, Sep. 1973.

Schwarz, F. C., Klaassens, J. B., A Controllable 45-kw Current Source for dc Machines, IEEE Transactions on Industry Applications, vol. IA-15, No. 4, Jul./Aug. 1979, pp. 437–444.

Schwarz, F. C., A Doublesided Cycle-Converter, IEEE Power Electronics Specialists Converence, San Diego, Jun. 1979, pp. 437–447.

Schwarz, F. C., A Method of Resonant Current Pulse Modulation for Power Converters, IEEE Transactions on Industrial Electronics and Control Instrumentation, vol. 17, No. 3, May 1970, pp. 209–221.

Schwarz, F. C., An Improved Method of Resonant Current Pulse Modulation for Power Converters, IEEE Transactions on Industrial Electronics and Control Instrumentation, IECI-23, No. 2, Jul. 14, 1975, pp. 133–141.

Schwarz, F. C., Klaassens, J. B., A Controllable Secondary Multikilowatt dc Current Source with Constant Maximum Power Factor in its Three Phase Supply Line, IEEE Transactions on Industrial Electronics and Control Instrumentation, vol. 23, No. 2, May 1976, pp. 142–150.

R. J. King, T. A. Stuart, Inherent Overload Protection for the Series Resonant Convert, IEEE Transactions on Aerospace and Electronic Systems, vol. AES-19, No. 6, Nov. 1983, pp. 820–829.

J. B. Klaassens, DC to AC Series-Resonant Converter System with High Internal Frequency Generating Synthesized Waveforms for Multi-Kilowatt Power Levels, IEEE Power Electronics Specialists Conference, Jun. 1984, Gaithersburg, Md., USA, pp. 99–110.

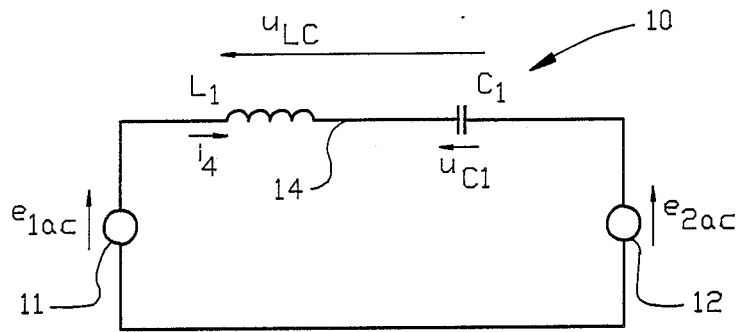
FIG. 3
PRIOR ART
PRIOR ART
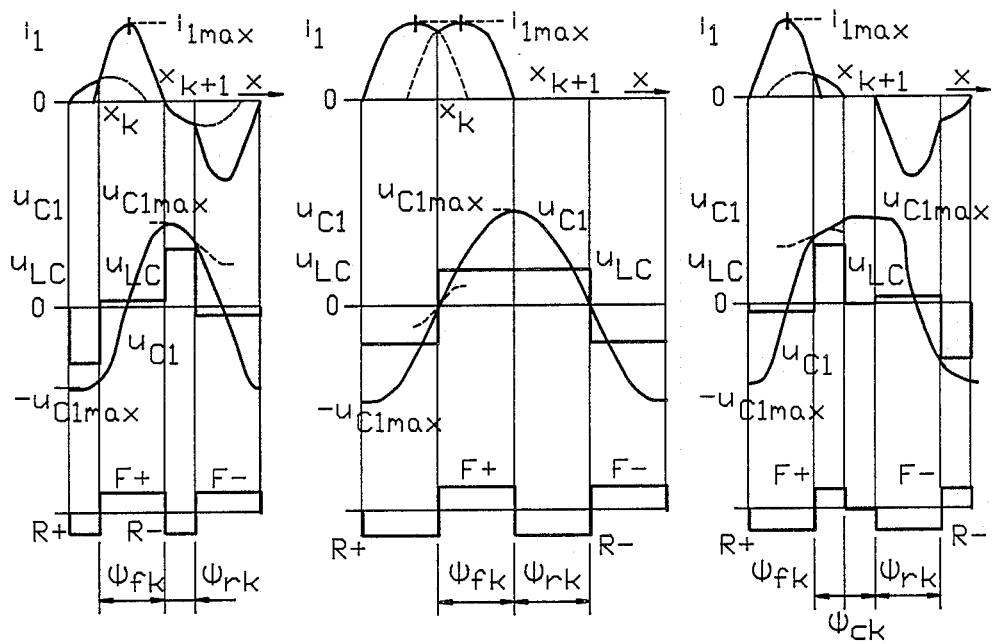
FIG. 4A   FIG. 4B   FIG. 4C

CONTROL CIRCUIT FOR RESONANT CONVERTERS

This application is a continuation; of application Ser. No. 874,600, filed June 16, 1986, now abandoned.

BACKGROUND OF THE INVENTION

1. Field of the Invention

The invention relates to electrical power conversion and more particularly to an improved control circuit for a high frequency resonant converter for transferring electrical power between first and second power terminals.

2. Information Disclosure Statement

In the last two decades, substantial progress has been made in electrical converters for transferring one form of electrical energy into a more useable form of electrical energy. Electrical converters have many applications such as motor controllers, the generation and transmission of electric energy, and various power supplies with low specific weight and volume.

Among the many methods of providing power conversion is the series resonant converter. In the series resonant converter, a DC or an AC input is applied through a semiconductor switching network to a series resonant circuit. The output of the series resonant circuit may be connected to a load through a second semiconductor switching network. The series resonant circuit oscillates at a high frequency typically 10 KHz. to 50 KHz. enabling the series resonant circuit to provide low specific weight and volume. Furthermore, the series resonant circuit provides natural current commutation of the semiconductor switching network or networks. Accordingly, the series resonant circuit provides an improved reliability due to the moderate stresses applied during switching of the semiconductor switches under zero current conditions.

Another advantage of the series resonant converter resides in the high internal resonant frequency which avoids the interposition of low frequency filters in the signal processing. The high frequency components generated by the series resonant converter can be inhibited from entering the source or the load by applying moderately sized high frequency filters.

Still a further advantage of the series resonant converter is found in the fast response and accurate control due to the high internal resonant frequency of the series resonant converter.

Various control circuits have been proposed in the prior art for improving the control, the power rating and the reliability of the basic series resonant converter. In addition, many circuits have been proposed in the prior art for enabling the output of single or multiphase AC waveform at a variable frequency output. However, none in the prior art have proposed a control system for a series resonant converter to the degree established by the present invention.

Therefore, it is an object of the present invention to provide an improved control circuit for a resonant converter for shaping each resonant current waveform independently of the load impedance and the polarity and magnitude of the output voltage.

Another object of the present invention is to provide an improved control circuit for a resonant converter for generating low distortion single phase or multiphase AC waveforms with bidirectional power flow from a two terminal DC or a multiterminal AC source of electrical energy.

Another object of the present invention is to provide an improved control circuit for a resonant converter capable of adapting to changes in the dynamics of the electrical source and/or the electrical load to insure the proper operating conditions for the resonant circuit.

Another object of the present invention is to provide an improved control circuit for a resonant converter capable of limiting the stored energy in the resonant circuit for normal and abnormal operating conditions of the resonant converter.

Another object of the present invention is to provide an improved control circuit for a resonant converter capable of quantizing the energy stored in a capacitor of the resonant circuit for each resonant cycle during normal and abnormal operating conditions of the resonant converter.

Another object of the present invention is to provide an improved control circuit for a resonant converter having power transfer control means for selectively actuating switch means to selectively initiate resonant pulses in the resonant circuit of the resonant converter for transferring electrical power between a source and a load.

Another object of the present invention is to provide an improved control circuit for a resonant converter having sensor means for instantaneously monitoring the voltage at the source and the load and the voltage and current in the resonant circuit to enable a predictor circuit to instantaneously and continuously predict prior to the completion of each of the resonant pulses when the initiation of conduction of the switch means will produce a resonant pulse having a final waveform in conformity with a pre-established standard.

Another object of the present invention is to provide an improved control circuit for a resonant converter capable of initiating conduction of the switch means within each resonant pulse to conform each resonant pulse to a pre-established standard and to quantize the energy stored in the capacitor of the series resonant circuit.

Another object of the present invention is to provide an improved control circuit for a resonant converter capable of applying the concepts of recurrent instantaneous forward or reverse power flow independent of the conversion ratio $q = u_o/e_s$ of the resonant converter.

The foregoing has outlined some of the more pertinent objects of the present invention. These objects should be construed to be merely illustrative of some of the more pertinent features and applications of the invention. Many other beneficial results can be obtained by applying the disclosed invention is a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims with a specific example being shown by the accompanying drawings. For the purpose of summarizing the invention, the invention is incorporated into an improved resonant converter for transferring electrical power between first terminal means and second terminal means. The converter comprises a resonant circuit including a capacitor and an inductor with a first and a second plurality of switch means interconnecting the resonant circuit with the first and second terminal means, respectively. A control circuit has power transfer control means and resonant circuit control means with the resonant circuit control means having a predictor circuit. The power transfer control means selectively actuates the switch means for selectively initiating resonant portions in the resonant circuit to transfer electrical power between the first and second terminal means. Sensor means instantaneously monitors the operation of the resonant converter. The sensor means is connected to the predictor circuit for predicting the final waveform of each of the resonant portions prior to the completion of the resonant portion. The resonant circuit control means compares an output of the predictor circuit to a pre-established standard for initiating conduction of the one of the switch means within each resonant portion to conform each of resonant portion to the pre-established standard.

In a more specific embodiment of the invention, the sensor means instantaneously monitors the voltage on the first and second terminal means and the voltage and current in the resonant circuit to enable the predictor circuit to instantaneously and continuously predict prior to the completion of the resonant portion when the initiation of conduction of the one of the switch means will produce a resonant portion having a final waveform in conformity with the pre-established standard. Preferably, the resonant circuit control mean initiates conduction of the one of the switch means to produce a resonant portion having a substantially constant value of energy in each resonant portion. In the alternative, the resonant circuit control mean initiates conduction of the one of the switch means to limit the voltage on the capacitor below a pre-established voltage level or to limit the current in the resonant circuit below a pre-established current level. Accordingly, the energy within each resonant portion is quantize at the pre-established standard.

In still a more specific embodiment of the invention, each oscillation of the resonant circuit comprises a first resonant portion or pulse wherein a resonant current flows in a first direction and comprises a second resonant portion or pulse wherein a resonant current flows in a second direction. Each of the first and second plurality of switch means comprises unidirectional switch means interconnected in an antiparallel configuration with the resonant circuit control means changing the conduction state of at least one of the switch means within each resonant portion to define a first duration of each resonant current portion wherein electrical power is transferred from one of the first and second terminal means to the resonant circuit and to define a second duration of each resonant current portion wherein electrical power is transferred to one of the first and second terminal means from the resonant circuit. The resonant circuit control means changes the conduction state of the switch means within each resonant portion to vary the relative time of the first duration and the second duration of each resonant current portion. Accordingly, the resonant control means changes the conduction state of at least one of the switch means within each resonant portion for applying a first voltage from one of the terminal means to the resonant circuit in the first duration of each resonant current portion and for applying a second voltage from one of the terminal means to the resonant circuit in the second duration of each resonant current portion.

In one example, the power transfer control means includes a power transfer reference signal and an output comparator for comparing the electrical power transferred by the resonant circuit with the power transfer reference signal. The output of the comparator is connected to the power transfer control means for selectively actuating the first and the second plurality of unidirectional switch means to initiate oscillation in the resonant circuit to transfer electrical power between the first and the second terminal means in accordance with the power transfer reference signal. The resonant circuit control means includes comparator means receiving an output of the predictor means for comparing the predicted output of the final waveform to the pre-established standard. The comparator means is connected to the resonant circuit control means for initiating conduction of the one of the switch means within each resonant portion to vary the relative magnitudes of the first and second durations within each resonant portion to conform each of the resonant portions of the resonant circuit to be in accordance with a pre-established standard of operation.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 3 illustrates a diagram of a double excited series resonant converter;

FIG. 4A illustrates a characteristic waveform for the series resonant converter of FIG. 2 for a step-up conversion ratio;

FIG. 4B illustrates a characteristic waveform for the series resonant converter of FIG. 2 for short circuited output terminals;

FIG. 4C illustrates a characteristic waveform for the series resonant converter of FIG. 2 for a step-down conversion ratio;

Similar reference characters refer to similar parts throughout the several views of the drawings.

DETAILED DISCUSSION

Figure 1:
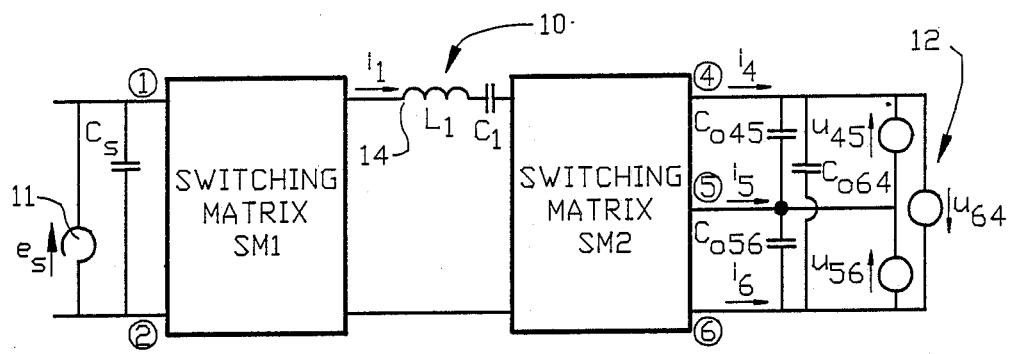
FIG. 1 is a symbolic representation of a DC to AC series resonant converter.

FIG. 1 illustrates a simplified version of a resonant converter 10 connected by input terminals to a source of power 11 having a voltage $e_s$ for transferring power to a load 12 through output terminals having a voltages $u_{omn}$ (mn=45,56,64). A resonant circuit 14 includes two matrices of switches SM1 and SM2, a capacitor $C_1$ and an inductor $L_1$. The source 11 of DC power is connected through a high-frequency filter $C_s$ to the switching matrix SM1. The switching matrix SM1 generates a modulated high-frequency carrier $i_1$ by excitation of the single resonant circuit 14. The high frequency carrier is demodulated by switching matrix SM2 which is a process of selective rectification of the resonant current $i_1$ and distribution of the current over three output phases. A rectified current waveform $i_m$ (m=4,5,6) is created at the output terminal m of SM2. The polarity of the current $i_m$ at the output of the switching matrix SM2 is dependent on the configuration of the switches of matrix SM2 but is independent of the polarity of the output voltages $u_{omn}$ and the resonant current $i_1$.

The high-frequency component of the current $i_m$ is eliminated by the high-frequency output filter $C_{omn}$. Accordingly, a low-frequency, three-phase, bipolar output current $i_{omn}$ creates a three-phase output voltage $u_{omn}$ to the load 12. The direction of the power flow between the source 11 and the load 12 is reversible and controllable in both directions. Accordingly, power flow can flow from the source 11 to the load 12 or power flow can flow from the load 12 to the source 11. The controlled switching matrices SM1 and SM2 perform the processes of modulated carrier generation and modulation according to the momentary direction of power flow for all practical values of the conversion ratio which will be described in greater detail hereinafter.

Figure 1A:
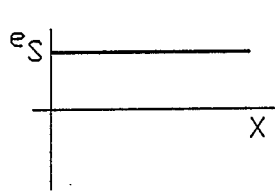
FIG. 1A a symbolic waveform present at the input of the series resonant converter of FIG. 1.
Figure 1B:
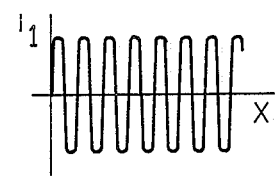
FIG. 1B a symbolic waveform present in the resonant circuit of the series resonant converter of FIG. 1.
Figure 1C:
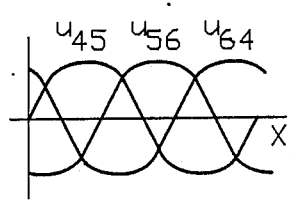
FIG. 1C a symbolic waveform present at the output of the series resonant converter of FIG. 1.

The series resonant converter 10 operates under the principles of pulse area control wherein a nonuniform and a periodic sampling process generates a required waveform which is refined by a low-pass filter. FIG. 1A illustrates the DC input voltage $e_s$ at the source 11 whereas FIG. 1B shows a modulated high-frequency carrier which is modulated by varying the time spacing between the current pulses $i_1$ in order to obtain a desired waveform. FIG. 1C illustrates the rectified current waveforms $i_m$ (m=4,5,6) which are created at the output terminal m of SM2 after the high frequency carrier is demodulated by switching matrix SM2.

The resonant converter 10 assumes the characteristics of a secondary current source since the power transfer and control circuit is based on charge control. The output current of the resonant converter 10 is essentially independent of the value and polarity of the output voltage across the load 12.

The time normalized with respect to the resonant frequency is given by $\omega_1 = 1\sqrt{L_1C_1}$. The normalized time is defined by $x = \omega_1 t$. A set of switches is activated at the time $x_k$ (k=0, 1,2, ...) with all variables within the time internal $[x_k, x_{k+1}]$ being denoted by the index k. All voltages are normalized with respect to the DC voltage $E_s$ of the source 11 while all currents are normalized with respect to $E_s/Z_1$, where $Z_1$ is the impedance of the resonant circuit 14 and is given by $Z_1 = \sqrt{L_1/C_1}$.

The voltage of the source 11 is considered to be $E_s = 1$ Volt, whereas the impedance of the normalized resonant circuit is considered to be equal to $Z_1 = 1$. The normalized output voltage of a DC to DC series resonant converter is consequently defined as the conversion ratio $q = U_o/E_s$.

Figure 2:
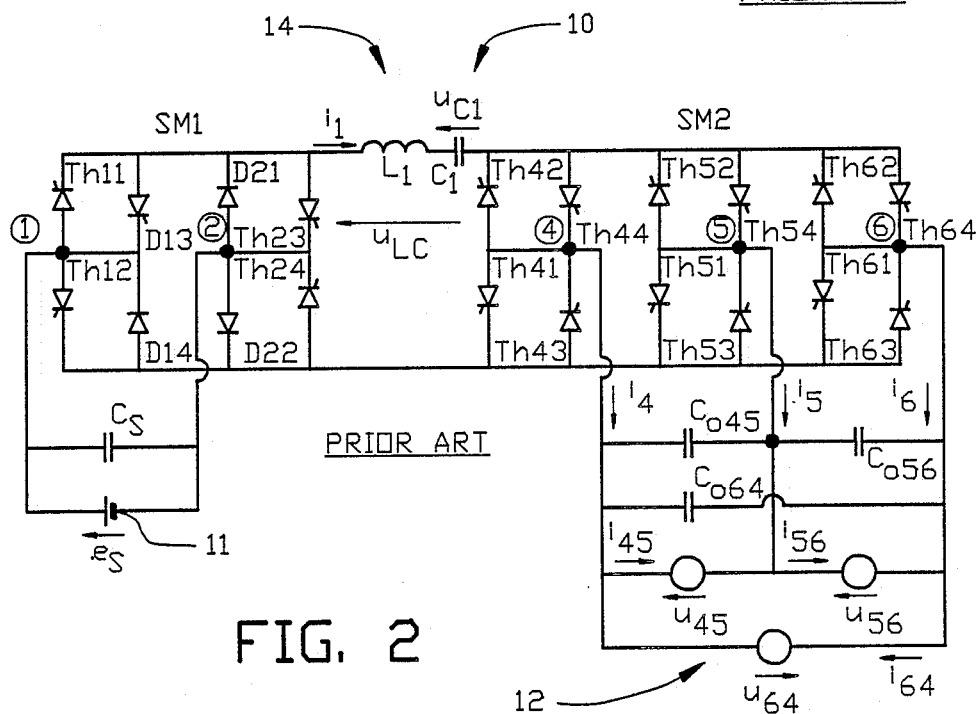
FIG. 2 is a schematic diagram of a resonant converter illustrating a series resonant converter having a three phase bipolar output.

As shown in more detail in FIG. 2, each of the switches in the matrices SM1 and SM2 is a combination of two antiparallel thyristors or transistors to provide control of the bipolar resonant current and allowing bipolar voltages $e_s$ and $u_o$. When a selected switching element of the two switching matrices SM1 and SM2 are turned on, the resonant circuit 14 consisting of the passive elements $L_1$, $C_1$, $C_s$ and $C_{omn}$ is closed. The resonant converter 10 operates as a double-excited LC circuit with the driving voltages $e_{1ac}$ and $e_{2ac}$, respectively, as illustrated in FIG. 3.

The driving voltage $e_{1ac}$ is a result of the operation of the switching matrix SM1 and will be equal to the source voltage $e_s$ with an alternating polarity $e_{1ac} = e_{sac}$. The driving voltage $e_{2ac}$ is a result of the operation of the switching matrix SM2 and will be equal to one out of the three output voltages $u_{o45}$, $u_{o56}$ or $u_{o64}$ with an alternating polarity $e_{2ac} = u_{omnac}$ where (mn=45,56,64). The resonant circuit 14 is driven by a voltage $u_{LC}$ where $u_{LC} = e_{sac} - u_{oac}$ which results in the resonant current $i_1$.

The operation of the resonant converter 10 of FIG. 2 is illustrated by the waveforms of the resonant current $i_1$ and the voltage $u_{C1}$ on the resonant capacitor C1 for constant voltages $e_s$ and $u_o$ during one cycle of operation, as a function of the time x, as shown in FIGS. 4A-4B. Each of the resonant pulses or portions 16 comprises a first and a second duration 17 and 18. The driving voltage $u_{LC}$ is at times out of phase with the resonant current $i_1$. The time interval or duration $\psi f k$ indicates a forward flow of energy from the source 11 to the resonant circuit 14, as observed for positive (negative) values of the resonant current $i_1$, denoted by F+(F−). The driving voltage of the resonant circuit 14 during the phase F presents itself as $u_{LCf} = (-1)^k(1-q)$ where (k=0,1,2, ... ). The time interval or duration $\psi_{rk}$ indicates a reverse flow of energy from the resonant circuit 14 to the source 11, as observed for positive (negative) values of the resonant current $i_1$ denoted by R+ (R−). The driving voltage of the resonant circuit 14 is $u_{LCr}=(-1)^k(1+q)$ with (k=0,1,2, ... ). The driving voltages of $u_{LCF}$ and $u_{LCr}$ serve as a voltage mirror for the voltage $u_{C1}$ on the resonant capacitor C1 during the F and R phases or durations of the resonant pulse or portion, respectively.

The output of the resonant converter 10 assumes the characteristics of a true secondary current source. By reversing the polarity of the output voltage, energy can be withdrawn from the load 12. For this mode of operation of resonant converter 10, the active semi-conductor switches of the output matrix SM2 are forward biased by the voltage on the output capacitors. The turn-off requirements of the switches are satisfied by introducing an interval $\psi_{rk}$ with zero current, in which the voltage on the resonant capacitor C1 forces a negative voltage over the switches which must be turned off.

The characteristic waveforms of the resonant circuit 14 are indicated in FIGS. 4A-4C for a positive average output current an three characteristic values of the conversion ratio q:

I. 0 q 1

The transfer of electrical power takes place from the source 11 to the load 12 with a voltage $u_o=q_{es}$. In this mode of operation the resonant converter 10 without a transformer operates as a STEP-DOWN CONVERTER.

II. q=0

No transfer of electrical power takes place between the source 11 to the load 12. If $Q_f$ is the distributed charge during the F phase, and $Q_r$ is the distributed charge during the F phase, and $Q_r$ is the distributed charge during the R phase, i.e., $$Q_f = \int_{x_K}^{x_K+\psi_{fk}} |i_L(x)|dx$$

$$Q_r = \int_{x_K+\psi_{fk}}^{x_K+1} |i_l(x)|dx$$

then in the case of q=0, for a lossless resonant circuit 14 $Q_f-Q_r=0$ and the average input current is $i_{sav}=Q_f-Q_r=0$ while $i_{oav}=Q_f+Q_r=0$.

III. −1 q 0

The transfer of electrical power takes place from the load 12 with a voltage $u_o=q_{es}$ to the source 11. During this mode of operation the resonant converter 10 without a transformer operates as a STEP-UP CONVERTER.

The waveforms shown in FIGS. 4A-4C illustrates the symmetry in the resonant waveforms for the step-down mode and step-up mode. If for both modes of operation the absolute values of the conversion ratio $|q|$ are equal and the amplitudes of the resonant current $i_1$ are equal. For the same condition, the amplitudes of the voltage $u_{C1}$ on the resonant capacitor C1 are equal.

Under conditions of cyclic stability and for a constant source voltage $e_s$ and a constant output voltage $u_o$, the charge $Q_{1k}$ per cycle, as generated by the undamped resonant circuit, is $$Q_{LK} = Q_{fk} - Q_{rK}$$

$$Q_{LK} = \int_{x_K}^{x_{K+1}} |i_1|dx = 2u_{clpp}$$

$$V_{CLpp} = 2u_{CLMAX} = \frac{(1+9)(1-\cos\psi_r)}{9-\cos\psi_r}$$

for a constant phase angle $\psi_{rk}=\psi_r$.

The maximum value of the resonant current for a condition of cyclic stability during the F or R phase can be calculated as $i_{fmax}=u_{Clmax}+q-1$ and $i_{rmax}=2-i_{fmax}$.

Under the conditions indicated above the average value of the constant output current can be written as $$i_{oav}=Q_1/(\psi_f+\psi_r)$$

$$i_{oav}=2U_{clmax}/(\psi_f+\psi_r)$$

The desired mode of switching the resonant converter 10 is to obtain a cyclically stable and limited amplitude of the voltage on the resonant capacitor C1 and current through the resonant inductor L1 for all regular and irregular conditions of operation. The critical parameters of the resonant converter 10 process are controlled by the phase angle $\psi_{rk}$ from pulse to pulse in a predictive way.

Fast control of the phase angle prevents the accrual of stored energy in the resonant circuit 14. A cyclically stable operation with limited amplitudes is obtained when the energy added to the resonant circuit 14 over each closed interval $[x_k,x_{k+1}]$ is equal to zero. Critical parameters are calculated before the firing instants of the switches, which set the phase angle $\psi_{rk}$.

Figure 5:
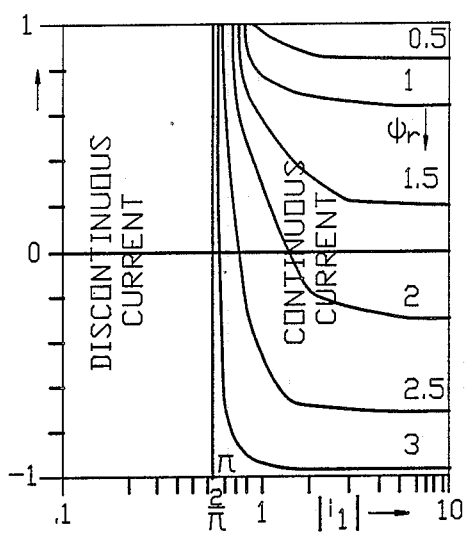
FIG. 5 is a graph illustrating the overload characteristics for a constant phase angle $\psi r$.

FIG. 5 represents the normalized output characteristics q versus $i_{oav}$ for a constant phase angle $\psi_r$. These characteristics give the relation between the normalized output voltage as defined by the conversion ratio q and the average value of the rectified resonant current $|i_1|_{av}$. For a constant value of the average output current, $i_{oav}=|i_1|_{ave}$.

Electrical power is dissipated in the load 12 when the above conditions are satisfied. The region of operation for the load 12 is limited by the curve $\psi_r=\psi_{rmin}$. A control system to be described in greater detail hereinafter, stabilizes the average output current and limits the maximum value of the output voltage to $9<9_{max}$.

FIG. 5 illustrates the overload characteristics for a constant but limited phase angle $\psi_r$ and indicate the characteristics required of the resonant converter 10 to generate a limited output current. For a lossless switching resonant circuit 14 with ideal components, the amplitudes of the resonant waveforms and consequently the average output current will increase asymptomatically to infinite values for a phase angle$_r=\arccos(q)$.

Figure 6:
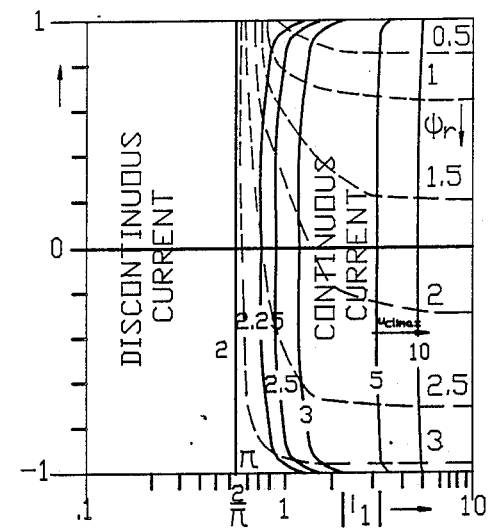
FIG. 6 is a graph of the normalized output characteristic for a constant phase angle $\psi r$ and a constant amplitude of the voltage $u_{c1max}$ on the resonant capacitor.

FIG. 6 illustrates a graph for constant values of the normalized voltage on the resonant capacitor $u_{Clmax}$, as set forth above. The boundary between continuous resonant current and discontinuous resonant current is observed for $i_{oav}=2/=0.6366$ where $\psi_r=\pi$ and $u_{Clmax}=2.0$.

For one polarity of the output current, the upper half of FIG. 5 is the forward flow of electrical power, while the lower half of FIG. 5 is the reverse flow of electrical power. For the resonant converter 10 of the present invention, the maximum value for the conversion ratio is equal to $q \simeq \eta = 0.95$, where $\eta$ is the conversion efficiency of the resonant converter 10.

Operation of the resonant converter 10 with respect to each output terminal and a constant source voltage is defined by three logical parameters:

a. parameter M (mode of operation) indicating the direction of the flow of electrical power:

M=0: transfer of energy from first source with a voltage $e_1$ to the second source with a voltage $e_2$ for $e_1 < e_2$ (STEP-UP CONVERSION).

M=1: transfer of energy from the first source with a voltage $e_1$ to the second source with a voltage $e_2$ for $e_1 > e_2$ (STEP-DOWN CONVERSION).

b. parameter W indicating the polarity of the output voltage $u_o$:

W=1: positive output voltage $u_o$;

W=0: negative output voltage $u_o$.

c. parameter $sgn(i_1)$ indicating the polarity of the resonant current $i_1$:

$sgn(i_1) = 1$; resonant current is positive;

$sgn(i_1) = 0$: resonant current is negative.

The set of parameters theoretically defines the status of the resonant converter 10 to be electronically generated by the control circuit of the present invention to energize the semiconductor switches. A resonant current pulse will start at the firing instant of the selected switches.

The momentary value of the current pulse is dependent on the initial value of the voltage on the resonant capcitor $C_1$ and the value of the voltage mirror $u_{LC}$. In addition, a more complex voltage mirror can be selected by appropriate firing schemes for the switches SM1 and SM2 of the resonant converter 10.

The resonant converter 10 of FIG. 2 includes a three-phase output with the thyristor switches identified by the symbol Th. The output phases having output voltages $u_{o4}$, $u_{o5}$ and $u_{o3}$ are identified by two-digit indices wherein the first index signifies the associated phase and the second index signifies the position in the group. The second index is related to the polarity of the resonant current $i_1$ with the index being 1 or 4 for a positive resonant current and with the index being 2 or 3 for a negative resonant current.

For a single phase output, the switching matrix SM2 comprises switches 41–44 and 51–54. By selecting the appropriate switches of Th44, Th51, Th43 and Th 52, or Th41, Th54, Th42 and Th53, respectively, the circuit is capable of delivering a positive or negative output-current $i_{45}$ to the load 12. By reversing the polarity of the output voltage, the direction of the flow of electrical power can be reversed for four-quadrant operation.

The control circuit of the present invention enables the resonant circuit 14 to start, shape and terminate each current pulse or portion independently of the output voltage polarity and magnitude of the loading impedance. The resonant converter 10 with the control circuit of the present invention is capable of generating single-phase waveforms under all loading conditions for a sinusoidal and non-sinusoidal output voltage to an inductive load.

Figure 7:
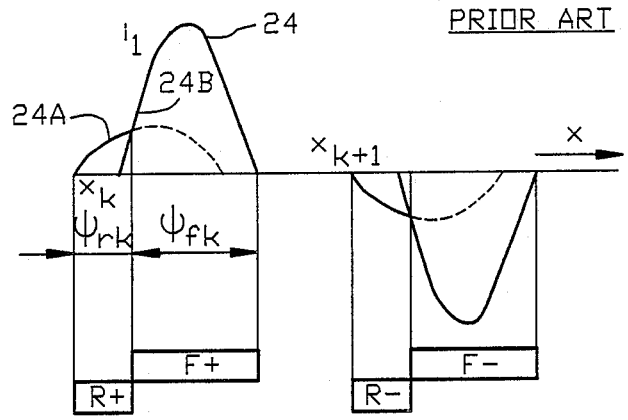
FIG. 7 illustrates a theoretical modulation for a resonant current portion or pulse $i_1$ with the resonant portion having a first and a second duration for an unconditionally stable oscillation.

The forcing function $u_{LC}$ is a combination of the constant input voltage $e_s$ and a relatively slow varying output voltage. The process of waveshaping is organized by an aperiodic modulation process of the interpulse time $x_{k+1} - x_k$ which produces a substantial difference between the minimum and maximum pulse frequency. Consequently, the stability of an oscillation in the resonant circuit is achieved when the F portion and R portion of each resonant oscillation or pulses satisfy the requirement of $Q_f = Q_r = 0$ as shown in FIG. 7. The variation of the phase angle $\psi r$ is defined and a stable oscillation can be maintained under all conditions of operation.

The switching matrix SM2 for a three-phase output comprises three legs as indicated in FIG. 2 with each leg containing two pairs of antiparallel thyristor switches. One pair of legs indicated by 45, 56 or 64 can be considered as a selective and controlled rectifier and is loaded by an output filter and a load impedance.

The switching matrix WM2 functions as a demultiplexer for the resonant current $i_1$ and is able to select two out of three phases from which or into which the resonant converter 10 will transfer electrical power at a given time. The selection of an output is performed by the electronic each output phase. The error signal contains information for each individual output port, with respect to the direction of the flow of electrical power and the level of electrical power.

The control circuit turns on the subset of semiconductor switches in the matrix SM2 to connect one of the three loads to the resonant circuit 14. For each output port, the set of logical signals $W_{mn}$, $M_{mn}$ and $sgn(i_1)$, are generated. Based on the level of electrical power for each port, the set of signals will control the mode of operation for the resonant circuit 14. The output current $i_{omn}$ is rectified with the polarity being dependent on the polarity of the voltage $u_{omn}$ and the direction of the power flow for output port being dependent on mn. The high-frequency content of the output currents of the switching matrix SM2 is removed by a high-frequency output filter $C_{omn}$.

The distribution of the current pulses and the control of the interspacing between the current pulses or portions for the individual output ports enables the generation of low frequency sinusoidal waveforms with a phase shift of $2\pi/3$ within the limitation set forth above.

For a symmetrical, three-phase load, the total output power delivered by the series resonant converter 10 is:

$$P_o = \frac{1}{2\pi}\left[\int_0^{2\pi} u_{45}i_{45}dx + \int_0^{2\pi} u_{56}i_{56}dx + \int_0^{2\pi} u_{64}i_{64}dx\right]$$

$$P_o = 3(u_1I_1 \cos\psi_1 + u_2I_2 \cos\psi_2 + \ldots)$$

where $U_j$: the rms-value of the output voltage $I_j$: the rms-value of the output current $J$: the phase angle between $U_j$ and $I_j$ for the harmonic output frequency component $f_j (j=1,2,3,\ldots)$. Contrary to the single phase converter, the power delivered by the multiphase series resonant circuit 14 is time-dependent enabling a substantially constant interpulse time of the resonant current pulses. Accordingly, the interpulse time is influenced only by the effect of the magnitude of the selected output voltage on the amount of charge $Q_f$ and $Q_r$.

The output voltage $u_{oac}$ as imposed on the resonant circuit 14 by switching matrix SM2. This voltage is reconstructed by the samples of the individual output voltages $u_{omn}$. As a result of the sampling process of the switching matrix SM2, the equivalent output voltage $u_{oac}$ as seen by the series resonant circuit 14 is one of the three output voltages. The magnitude of $u_{oac}$ may vary substantially between maximum and minimum output voltages. Accordingly, the control circuit selects a phase angle $\psi$rk under all regular and irregular conditions to prevent an interrupt of the oscillation. The distribution of energy through a resonant circuit may be (a.) from the source $e_s$ to the output with a voltage $u_o$, (b.) from the load with a voltage $u_o$ to the source $e_s$, for any practical conversion ratio q. The status of the multiphase resonant converter 10 is defined by three parameters: (1) the direction of the power flow, (2) the priority of one phase above the others, (3) the polarity of the output voltage of the selected phase. The bipolar single-phase or multiphase synthetic waveforms are generated by modulation of the interpulse time $x_{,k+1} - x_k$. The characteristics of the wave shape at the output of the converter is acquired from the reference signal connected to the electronic protection and control system.

In the case of a polyphase load, the amount of charge and the direction of current flow relative to one phase of the load is controlled such that the difference between the output variable and the respective reference or error signal is minimized. For no load conditions, the resonant converter 10 varies the voltage at the output capacitors in a controlled manner by programming the output currents of the switching matrix SM2 with respect to the polarity and the current pulse area per cycle for an capacitive load $C_1$. For a resistive load $R_1$, or a combination of a resistive $R_1$ and an inductive load $L_1$ in parallel with the output capacitors $C_o$, the resonant converter 10 varies the voltage at the output terminals in a controlled manner while electrical power is absorbed in the resistive part of the load.

For each phase 45, 56, or 64, the load impedance $Z_l$ is equivalent to the combination of the output filter capacitor $C_o$, in parallel with the series connection of the inductive part of the load $L_1$ and the resistive part of the load $R_1$. The minimum value of the output capacitor $C_o$ per phase is determined by calculating the ripple voltage at the output terminals. The maximum value of the output capacitor $C_o$ is limited by the current capacity of the resonant converter 10 per unit of load current.

Figure 8:
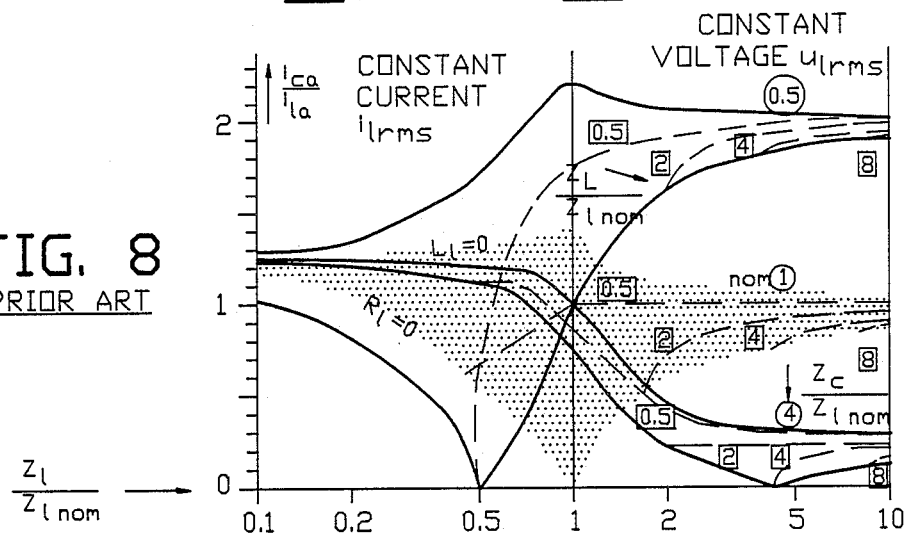
FIG. 8 illustrates a graph of the normalized current per output phase as a function of the normalized load impedance.

FIG. 8 is a graph of the ratio of the current $i_c$ over the load current $i_1$ for a sinusoidal output voltage $u_{omn}$. The frequency of the sinusoidal output voltage is $f_1$ where $i_{ca}$ is the amplitude (index a) of the sinusoidal component of the output current of the switching matrix SM2 and $i_{1a}$ is the amplitude of the low-frequency load current.

For the nominal output impedance $Z_{lnom}$, the amplitudes of the low-frequency sinusoidal output voltage and output current, respectively, obtain the maximum value, independent of the phase shift. For $Z_l < Z_{lmon}$ the amplitude of the load current is limited.

FIG. 8 also illustrates a set of curves which have been generated for a constant value of the normalized impedance of the output capacitor $Z_C/Z_{lnom}$ and the variable normalized impedance of the output inductance $Z_L/Z_{lnom}$ which is indicated by the shaded area for a particular value for $Z_C/Z_{lnom}=1$. Curves for a constant normalized load inductance $Z_L/Z_{lnom}$, are indicated in FIG. 8 by dashed lines. The upper boundary of each set of curves is defined for $L_1=0$ for a resistive load, while the lower boundary of each set is defined for $R_1=0$ for an inductive load. For the inductive load, the current of the resonant converter 10 may be minimized by utilizing the exchange of electrical energy between the output capacitor and the inductive load in parallel.

As indicated in FIG. 8, other sets of curves can be generated for different values of $Z_C/Z_{lnom}$. Depending on the mode of operation either constant output voltage or constant output current, a value for the normalized output capacitor $Z_C/Z_{lnom}$ is selected. Depending on the specifications of the load $Z_l$ and the maximum frequency $f_1$ at the output terminals, an optimal value for the output capacitor can be calculated.

Figure 9:
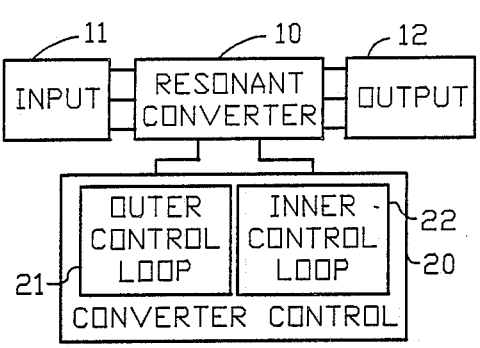
FIG. 9 is a simplified block diagram of the improved control circuit of the present invention.

FIG. 9 is a block diagram of the converter control circuit 20 of the present invention for controlling the resonant converter 10 between the input 11 and the load 12. The converter control circuit 20 comprises an outer control loop 21 and an inner control loop 22. The outer control loop 21 activates the switches in the resonant converter 10 to control the total power transferred between the input 11 and the load 12. The inner control loop 22 activates the switches in the resonant converter 10A to control the energy contained in each discrete resonant pulse of the resonant converter 10A.

Figure 10:
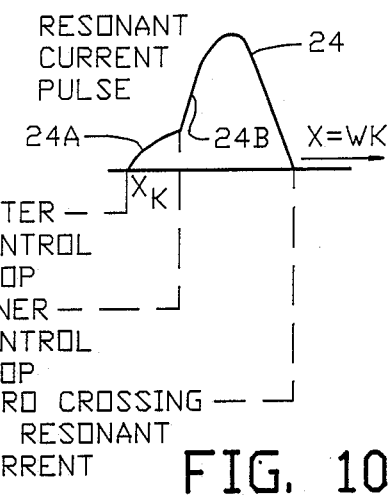
FIG. 10 illustrates the portion of each resonant pulse which is respectively controlled by the inner and outer control loops of FIG. 9.

FIG. 10 illustrated a resonant pulse of portion 24 having a first duration 24A and a second duration 24B. The initiation of the first duration 24A is controlled by the outer control loop 21 whereas the initiation of the second duration 24B is controlled by the inner control loop 22. The initiation of the first duration 24A by the outer control loop 21 controls the total power transferred between the input 11 and the load 12. The initiation of the second duration 24B by the inner control loop 22 controls the energy contained in each discrete resonant pulse of the resonant converter 10A. The prior art control circuits did not contemplate the such an inner control loop but only considered an outer control loop.

Figure 11:
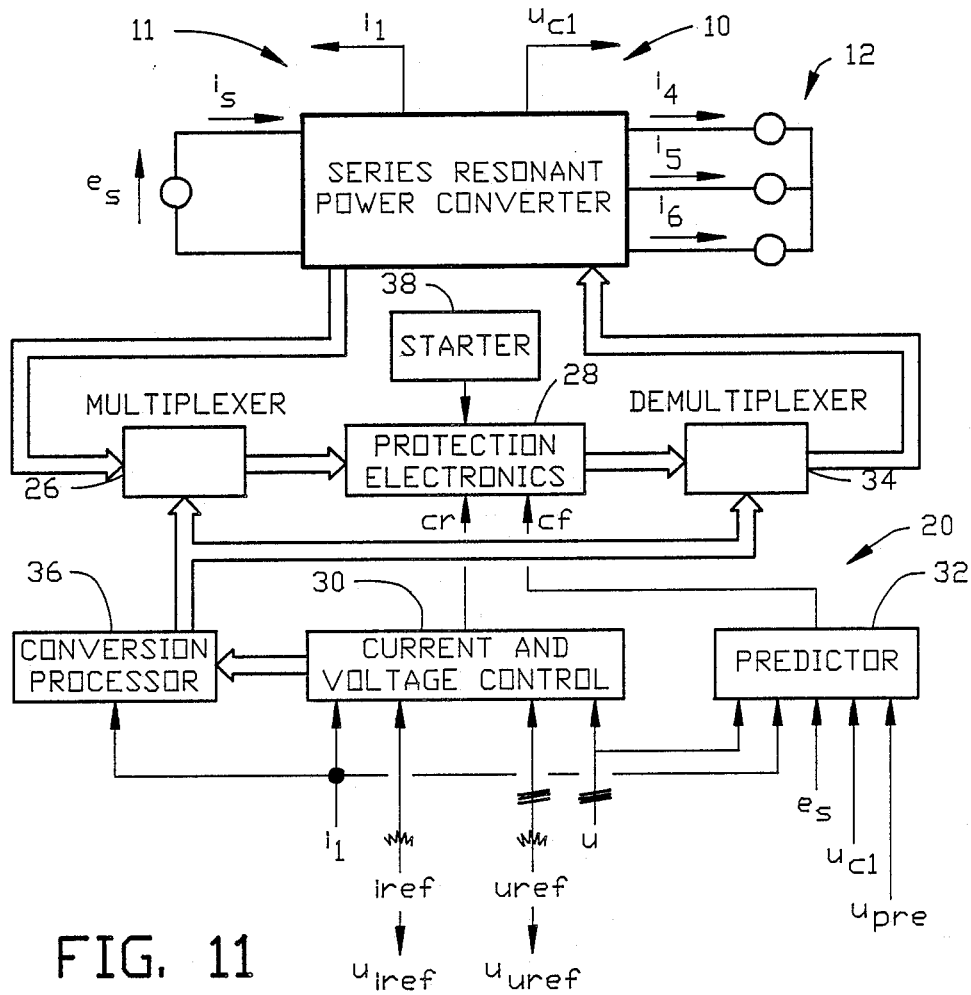
FIG. 11 is a more detailed block diagram of the improved control circuit of FIG. 9.

FIG. 11 is a more detailed block diagram of the series-resonant converter 10 capable of bidirectional power flow and polyphase output. Depending on the status of the resonant converter 10 as controlled by the parameters M, W and sgn($i_1$, the actual conditions of the thyristor switches are transmitted through a multiplexer 26 and are stored in a protection circuit 28. The stored information is used at the instant of firing of the next thyristor switches. The protection circuit 28 excludes simultaneous conduction of two thyristors connected in series across a voltage source under all regular and irregular conditions. A resonant current pulse in the resonant converter 10 is initiated by a current and voltage control 30 by transmitting a signal $c_r$ to the protection circuit 28. The output of the protection circuit 28 is controlled by the reference signal $u_{uref}$ or $u_{iref}$. The control process follows the principles of pulse area control which should be well known to those skilled in the art.

The operation of the predictor circuit 32 is based on the calculation of the maximum value for the voltage on the capacitor $C_1$ by the use of $$U_{CLMAX} = U_{CL}(X_K + \psi_{fK})$$

$$U_{CLMAX} = 1 - 9 + \sqrt{I_L{}^2(X_K) + U_{L1}^2(X_K)}$$

where the voltage on the inductor $L_1$ during the F phase is equal to $u_{L1}(x) = 1 - q - u_{C1}(x)$. Accordingly, the predictor circuit 32 selects a phase angle $\psi$rk to predict the amplitude of the voltage $u_{C1}$ or the resonant current $i_1$ during the F- or R-phase. A constant reference signal $u_{pref}$ fixes the maximum value for the indicated waveforms. The control circuit 20 protects the resonant converter 10A against excessive values of the energy stored in the resonant capacitor and inductor. The predictor circuit 32 is used to satisfy the conditions of a continuous oscillation for each half period independently of the waveforms generated at the output or independent of the time-varying output voltages. The inner control loop 22 controls the oscillation for each half period of the oscillation or for each resonant pulse whereas the outer control loop 21 controls the time varying output voltages. Accordingly, the predictor circuit 32 generates a signal to limit the phase angle $\psi rk$ under all regular and irregular conditions. Each current pulse is a combination of an R-phase followed by an F-phase current with equal polarity, as indicated in FIG. 7. Control of the phase angle $\psi rk$ is obtained by generating the signal $c_r$ by the predictor circuit 32 to initialize the F-phase.

The distribution of the signals to the gate amplifiers of the actual thyristors is governed by the demultiplexer 34. The operation of the multiplexer 26 and the demultiplexer 34 is performed by the status signals from the resonant converter 10. The status of the resonant converter 10 is controlled by the signals M, W and $sgn(i_1)$, as explained herein. Signals M, W and $sgn(i_1)$ are generated by a conversion processor 36. The conversion processor 36 receives information from the signals generated by the current and voltage control circuit 30 and the resonant current $i_1$. The points in time where the output signals will be varied are locked to the zero crossing of the resonant $i_1$. A starter 38 completes the protection and control electronics.

Figure 12:
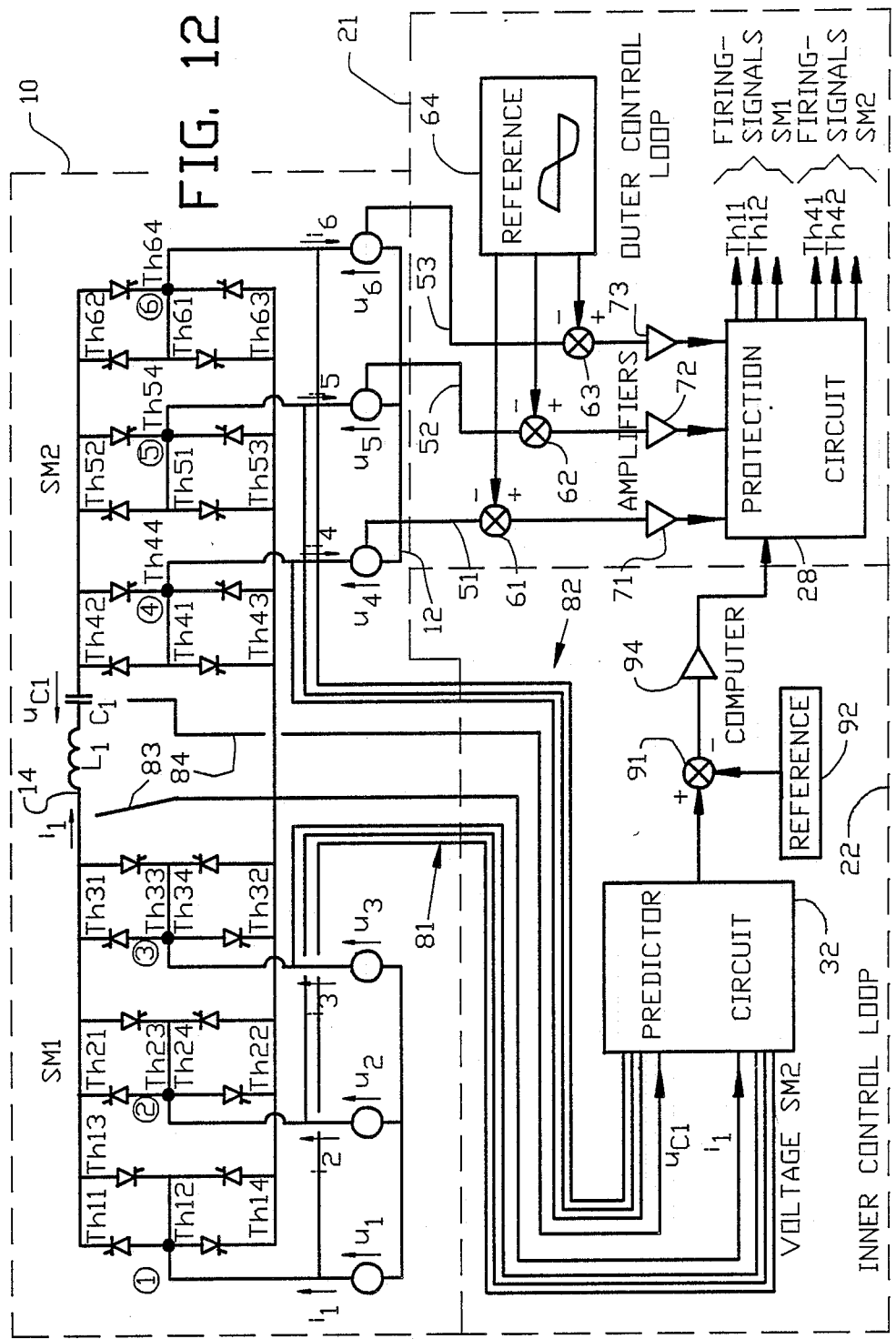
FIG. 12 is a schematic diagram of a series resonant converter having a three phase bipolar output incorporating the improved control circuit shown in FIGS. 9, 11 and 12.

FIG. 12 is a schematic diagram of the resonant converter 10 of the present invention which is similar to the resonant inverter shown in FIG. 2. The outer control loop receives inputs of the current $i_4$, $i_5$, and $i_6$ along line 51, 52 and 53 to summing devices 61, 62 and 63. The summing devices 61, 62 and 63 receive reference signals from a reference source 64. Amplifiers 71, 72 and 73 apply the amplified signals to the protection and control protection circuit 28. The output of the protection circuit 28 fires the thyristors as heretofore described. The inner control loop 22 senses the input voltage along lines 81 and senses the output voltage along lines 82. The current through the resonant circuit 14 is transferred by line 83 whereas the voltage on capacitor $C_1$ is transferred by line 84 to a processor 90. The output of the processor 90 is transferred to a summing device 91 which receives an input from a reference 92 to provide an output to a comparator 94. The output of comparator 94 is connected to the protection circuit 28 for firing the switch means as heretofore described.

Figure 13:
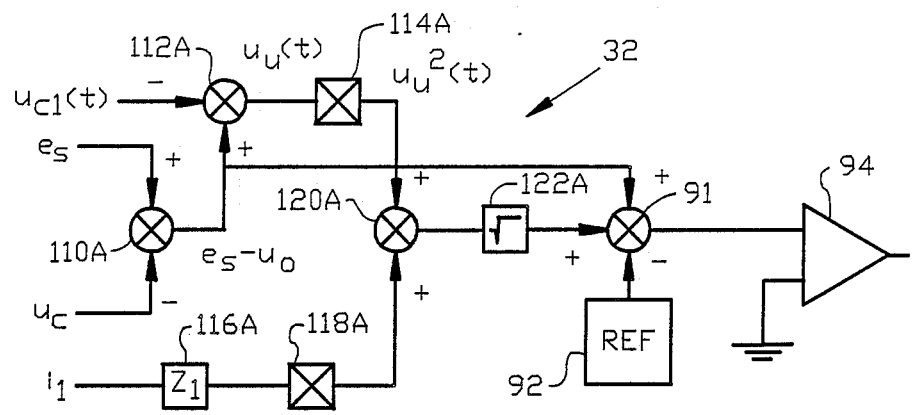
FIG. 13 illustrates a first embodiment of the predictor circuit shown in FIGS. 9, 11 and 12.

FIG. 13 is one embodiment of a predictor circuit 32A for the inner control loop 22. In this embodiment, $e_s$ and $u_o$ are applied to a summer 110A, the output of which is applied to a summer 112A which also receives an input $u_{cl}(t)$. The output of summer 112A is applied to a multiplier 114A. The value of current $i_1$ is applied to a multiplier 116A and a multiplier 118A to provide input to a summer 120A. The output of multiplier 114A is also applied to summer 120A. The output of summer 120A is passed through an extractor 122A which extracts the square root of the input. The output of extractor 122A is applied to the summer 91 wherein the extracted value is summed with the reference standard 92. The output of summer 91 is applied to the zero crossing comparator 94 as shown in FIG. 12 to drive the protection circuit 28. The predictor circuit 32A shown in FIG. 13 is desirable for use when the primary control parameter is limiting the voltage on the capacitor $C_1$.

Figure 14:
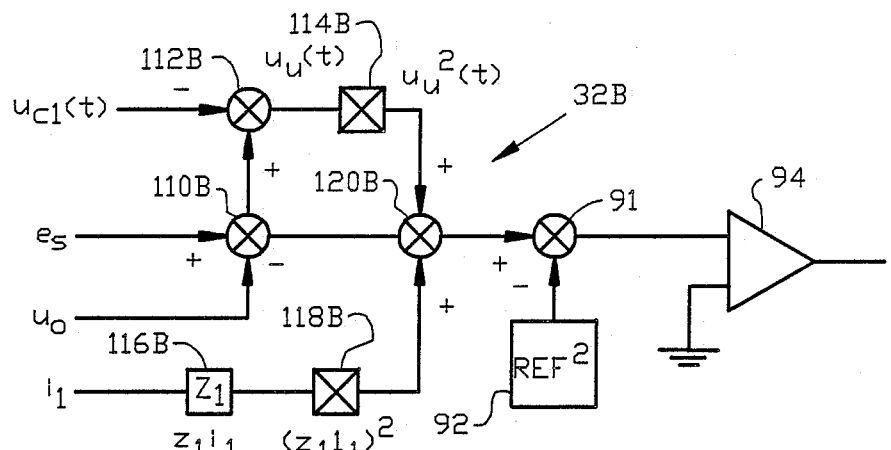
FIG. 14 illustrates a second embodiment of the predictor circuit shown in FIGS. 9, 11 and 12.

FIG. 14 is a second embodiment of a predictor circuit 32B for the inner control loop 22. In this embodiment, $e_s$ and $u_o$ are applied to a summer 110B, the output of which is applied to a summer 112B which also receives an input $u_{cl}(t)$. The output of summer 112B is applied through a multiplier 114B. The value of current $i_1$ is applied to a multiplier 116B and a multiplier 118B to provide input to a summer 120B. The output of multiplier 114B is also applied to summer 120B. The output of summer 120B is applied to the summer 91 with the value of summer 120B being summed with the square of the reference standard 92. The output of summer 91 is applied to the zero crossing comparator 94 as shown in FIG. 12 to drive the protection circuit 28. The predictor circuit 32B shown in FIG. 14 is desirable for use when the primary control parameter is limiting the current in the resonant circuit 14.

Figure 15:
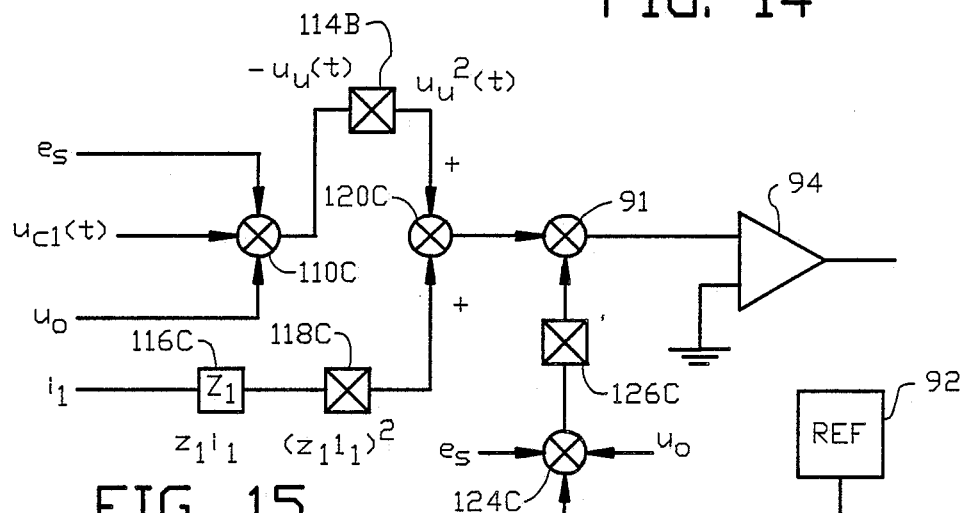
FIG. 15 illustrates a third embodiment of the predictor circuit shown in FIGS. 9, 11 and 12.

FIG. 15 is a third embodiment of a predictor circuit 32C for the inner control loop 22. In this embodiment, $e_s$, $u_o$ and $u_{cl}(t)$ are applied to a summer 110C the output of which is applied to a multiplier 114C. The value of current $i_1$ is applied to a multiplier 116C and a multiplier 118C to provide input to a summer 120C. The output of multiplier 114C is also applied to summer 120C. The output of summer 120C is applied to the summer 91. The reference signal 92 is applied with $e_s$ and $u_o$ to a summer 124C the output of which is multiplied by a multiplier 126C and is applied to the zero crossing comparator 94 as shown in FIG. 12 to drive the protection circuit 28. The predictor circuit 32C shown in FIG. 15 is desirable for use when the primary control parameter is limiting the energy in the resonant circuit 14.

An experimental three-phase dc-ac converter of the type described above was designed and constructed to exchange 4kVA of power with a dc-source with e=350 V. The switching matrix SM1 was constructed in the form of a half bridge configuration and the switching matrix SM2 as a full-bridge configuration. The resonant converter 10 without a high-frequency transformer demonstrates a step-up ratio of 1:2 for the output currents with respect to the input current. The maximum efficiency of a 50 Hz converter with a maximum momentary output power of 8 kWatt was measured at 89 percent. The harmonic distortion of a 50 Hz, single phase or three phase sinusoidal output voltage for a maximum carrier frequency of 20 kHz was measured at 2% and 4.5%.

The present disclosure includes that contained in the appended claims as well a that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved resonant converter for transferring electrical power between first terminal means and second terminal means, comprising in combination:
   a resonant circuit including a capacitor and an inductor;

a first and a second plurality of switch means interconnecting said resonant circuit with the first and second terminal means, respectively;

a control circuit comprising outer control means and inner control means having a predictor circuit for controlling said resonant circuit;

said outer control means selectively actuating said switch means for selectively initiating resonant portions in said resonant circuit to transfer electrical power between the first and second terminal means;

sensor means for instantaneously monitoring the operation of the resonant converter;

means connecting said sensor means to said predictor circuit for predicting the final waveform of each resonant portion prior to the completion of the resonant portion; and said inner control means comparing an output of said predictor circuit to a pre-established standard for initiating conduction of one of said switch means within each resonant portion to conform each of resonant portion to said pre-established standard.

2. An improved resonant converter for transferring electrical power between first terminal means and second terminal means, comprising in combination:

a series resonant circuit including a capacitor and an inductor;

a first and a second plurality of switch means interconnecting said resonant circuit with the first and second terminal means, respectively;

a control circuit comprising outer control means and inner control means having a predictor circuit for controlling said resonant circuit;

said outer control means selectively actuating said switch means for selectively initiating resonant portions in said resonant circuit to transfer electrical power between the first and second terminal means;

sensor means for instantaneously monitoring the voltage on the first and second terminal means and the voltage and current in said resonant circuit;

means connecting said sensor means to said predictor circuit for instantaneously and continuously predicting prior to the completion of the resonant portion when the initiation of conduction of one of said switch means will produce a resonant portion having a final waveform in conformity with said pre-established standard; and said inner control means comparing an output of said predictor circuit to a pre-established standard for initiating conduction of said one of said switch means within each resonant portion to conform each resonant portion to said pre-established standard.

3. An improved resonant converter as set forth in claim 2, wherein said resonant circuit control mean initiates conduction of said one of said switch means to produce a resonant portion having a substantially constant value of energy in each resonant portion.

4. An improved resonant converter as set forth in claim 2, wherein said resonant circuit control mean initiates conduction of said one of said switch means to limit the voltage on said capacitor below a pre-established voltage level.

5. An improved resonant converter as set forth in claim 2, wherein said resonant circuit control mean initiates conduction of said one of said switch means to limit the current in said resonant circuit below a pre-established current level.

6. An improved resonant converter for transferring electrical power between first terminal means and second terminal means, comprising in combination:

a resonant circuit including a capacitor and an inductor;

a first and a second plurality of switch means interconnecting said resonant circuit with the first and second terminal means, respectively;

a control circuit comprising outer control means and inner control means having a predictor circuit for controlling said resonant circuit;

said outer control means selectively actuating said switch means for selectively initiating resonant portions in said resonant circuit to transfer electrical power between the first and second terminal means;

sensor means for instantaneously monitoring the operation of the resonant converter;

means connecting said sensor means to said inner control means for predicting the final waveform of each of the resonant portion prior to the completion of the resonant portion; and said inner control means comparing the predicted output of the final waveform of each resonant portion to a pre-established standard for initiating conduction of one of said switch means within each resonant portion to quantize the energy transferred in each resonant portion to be at said pre-established standard.

7. An improved resonant converter for transferring electrical power between first terminal and second terminal means, comprising in combination:

a series resonant circuit including a capacitor and an inductor;

a first and a second plurality of switch means interconnecting said resonant circuit with the first and second terminal means, respectively;

a control circuit resonant comprising outer control means and inner control means having a predictor circuit for controlling said resonant circuit;

said outer control means selectively actuating said switch means for selectively initiating oscillation of said resonant circuit to control the transfer of electrical power between the first and second terminal means;

said oscillation of said resonant circuit comprising a first resonant portion wherein a resonant current flows in a first direction and a second resonant portion wherein a resonant current flows in a second direction;

said inner control means initiating conduction of one of said switch means within each resonant portion to define a first duration of each resonant portion wherein electrical power is transferred from one of the terminal means to said resonant circuit and to define a second duration of each resonant portion wherein electrical power is transferred to one of the terminal means from said resonant circuit;

sensor means for instantaneously monitoring the operation of the resonant converter;

means connecting said sensor means to said predictor circuit to initiate calculating at the commencement of each resonant portion and to predict the final waveform of each resonant portion prior to the completion of the respective resonant portion; and said inner control means comparing an output of said predictor circuit to a pre-established standard for controlling the time of initiation of conduction of one of said switch means within each resonant portion to provide a constant transfer of energy within each resonant portion.

8. An improved control circuit for a high frequency series resonant converter, the resonant converter having a capacitor connected in series with an inductor with a first and a second plurality of unidirectional switch means respectively interconnecting the series resonant circuit to first and second terminal means, the resonant converter having outer control means for selectively actuating said first and second plurality of unidirectional switch means for selectively initiating alternate polarity high frequency resonant current pulses in said series resonant circuit to transfer of electrical power between the first and second terminal means;

the improvement comprising:
inner control means having a predictor circuit for instantaneously monitoring the operation of the resonant converter to instantaneously predict the final waveform of each of said high frequency resonant current pulses prior to the completion of the respective high frequency resonant current pulse; and
said inner control means selectively actuating at least one of said first and second plurality of unidirectional switch means within each of said high frequency resonant current pulses to alter the voltage applied to the series resonant circuit by the first and second terminal means to conform each of said high frequency resonant current pulses to be in accordance with a pre-established standard.

9. An improved resonant converter as set forth in claim 8, wherein said resonant circuit control mean initiates conduction of said one of said switch means to produce a resonant portion having a substantially constant value of energy in each resonant portion.

10. An improved resonant converter as set forth in claim 8, wherein said resonant circuit control mean initiates conduction of said one of said switch means to limit the voltage on said capacitor below a pre-established voltage level.

11. An improved resonant converter as set forth in claim 8, wherein said resonant circuit control mean initiates conduction of said one of said switch means to limit the current in said resonant circuit below a pre-established current level.

12. An improved resonant converter for transferring electrical power between input terminal means and output terminal means, comprising:
a resonant circuit including a capacitor and an inductor;
a first and a second plurality of switch means interconnecting said resonant circuit with the input terminal means and the output terminal means;
power sensor means for sensing the power transfered by said resonant converter between the input terminal means and the output terminal means;
outer control means including a power reference signal and a power comparator;
said power reference signal establishing the desired power transfer between the input terminal means and the output terminal means;
means connecting said power sensor means and said power reference signal to said output comparator for providing a power comparator output;
means connecting said power comparator output from said power comparator to said outer control means for selectively actuating said first and said second plurality of switch means to initiate oscillation in said resonant circuit to transfer electrical power between the input and the output terminal means in accordance with said power reference signal;
said oscillation of said resonant circuit having a first resonant portion wherein a resonant current flows toward said resonant capacitor of said resonant circuit and having a second resonant portion wherein a resonant current flows away from said resonant capacitor of said resonant circuit;
inner control means being able to initiate conduction of one of said switch means within each of said resonant portions for dividing each of said resonant portions into a first duration and a second duration;
said first duration of each of said resonant portions transfering electrical power from said resonant circuit to one of the input and output terminal means;
said second duration of each of said resonant portions transfering electrical power from one of the input and output terminal means to said resonant circuit;
resonant sensor means for instantaneously monitoring the operation of the resonant circuit;
said inner control means further comprising a resonant reference signal, a predictor circuit and a resonant comparator;
said resonant reference signal establishing a desired standard of energy transfer through said resonant circuit for each of said resonant portions;
means connecting said resonant sensor means to said predictor circuit for initiating calculation at the commencement of each of said resonant portions to predicting the final quantity of energy of each of said resonant portions prior to the completion of the respective resonant portion;
means connecting said predictor circuit and said resonant reference signal to said resonant comparitor for comparing a predicted output from said predictor circuit to said resonant reference signal;
means connecting said comparator means to activate said inner control means for initiating the conducting of one of said switch means within each of said resonant portions to vary the relative magnitudes of said first and second durations in each of said resonant portions; and
said variation of the relative magnitudes of said first and second durations conforming the quantity of energy transferred in each of said resonant portions with said desired standard of energy transfer for each resonant portion thereby producing a uniform transfer of energy for each of said resonant portions of oscillation of said resonant circuit.

* * * * *